US008060775B1

(12) United States Patent
Sharma et al.

(10) Patent No.: US 8,060,775 B1
(45) Date of Patent: Nov. 15, 2011

(54) METHOD AND APPARATUS FOR PROVIDING DYNAMIC MULTI-PATHING (DMP) FOR AN ASYMMETRIC LOGICAL UNIT ACCESS (ALUA) BASED STORAGE SYSTEM

(75) Inventors: Mona Sharma, Pune (IN); Siddhartha Nandi, Pune (IN); Praveen Kumar Padia, Pune (IN)

(73) Assignee: Symantec Corporation, Mountain View, CA (US)

( * ) Notice: Subject to any disclaimer, the term of this patent is extended or adjusted under 35 U.S.C. 154(b) by 592 days.

(21) Appl. No.: 11/818,609

(22) Filed: Jun. 14, 2007

(51) Int. Cl.
G06F 11/00 (2006.01)
(52) U.S. Cl. .................. 714/5.11; 714/4.2; 714/4.21
(58) Field of Classification Search .............. 714/4, 5, 714/8, 9, 42, 43, 4.2, 4.21, 5.11
See application file for complete search history.

(56) References Cited

U.S. PATENT DOCUMENTS

| | | | |
|---|---|---|---|
| 4,096,561 A | 6/1978 | Trinchieri | |
| 4,104,718 A | 8/1978 | Poublain et al. | |
| 4,318,182 A | 3/1982 | Bachman et al. | |
| 5,463,615 A | 10/1995 | Steinhorn | |
| 5,471,638 A | 11/1995 | Keeley | |
| 5,574,922 A | 11/1996 | James | |
| 5,666,515 A | 9/1997 | White et al. | |
| 5,778,441 A | 7/1998 | Rhodehamel et al. | |
| 5,845,147 A | 12/1998 | Vishlitzky et al. | |
| 6,018,576 A | 1/2000 | Croslin | |
| 6,026,461 A | 2/2000 | Baxter et al. | |
| 6,134,636 A | 10/2000 | Mathews et al. | |
| 6,163,855 A | 12/2000 | Shrivastava et al. | |
| 6,256,748 B1 | 7/2001 | Pinson | |
| 6,292,905 B1 | 9/2001 | Wallach et al. | |
| 6,438,705 B1 | 8/2002 | Chao et al. | |
| 6,457,139 B1 * | 9/2002 | D'Errico et al. ................ | 714/5 |
| 6,578,158 B1 | 6/2003 | Deitz et al. | |
| 6,601,128 B1 | 7/2003 | Burton | |
| 6,708,166 B1 | 3/2004 | Dysart et al. | |
| 6,766,413 B2 | 7/2004 | Newman | |
| 6,785,750 B1 * | 8/2004 | Odenwald ...................... | 710/38 |
| 6,789,141 B2 | 9/2004 | Ayukawa et al. | |
| 6,868,442 B1 | 3/2005 | Burdeau | |
| 6,904,469 B2 | 6/2005 | Ido et al. | |
| 6,904,477 B2 | 6/2005 | Padmanabhan et al. | |
| 6,931,567 B2 * | 8/2005 | Tanaka et al. ..................... | 714/6 |
| 6,954,881 B1 | 10/2005 | Flynn Jr. et al. | |
| 7,194,662 B2 | 3/2007 | Do et al. | |
| 7,206,805 B1 | 4/2007 | McLaughlin, Jr. | |
| 7,272,674 B1 | 9/2007 | Nandi et al. | |
| 7,289,992 B2 | 10/2007 | Walker | |

(Continued)

OTHER PUBLICATIONS

Sun Microsystems, man pages section 3: Extended Library Functions MP_SetTPGAccess(3MPAPI), Feb. 15, 2006, 1 page, http://docs.sun.com/app/docs/doc/816-5172/mp-settpgaccess-3mpapi?a=view.*

(Continued)

Primary Examiner — Joshua A Lohn
(74) Attorney, Agent, or Firm — Campbell Stephenson LLP

(57) ABSTRACT

A method and apparatus for providing dynamic multi-pathing for an asymmetrical logical unit access (ALUA) based storage system. The method comprises identifying a first processor within a storage system as providing an optimized path to a disk array, identifying a second processor within a storage system as providing an unoptimized path to the disk array and, in response to failure of the optimized path, immediately switching from the optimized path to the unoptimized path.

18 Claims, 2 Drawing Sheets

U.S. PATENT DOCUMENTS

| | | |
|---|---|---|
| 7,318,138 B1 | 1/2008 | Usgaonkar |
| 7,444,541 B2 * | 10/2008 | Lubbers et al. .................. 714/5 |
| 7,730,274 B1 | 6/2010 | Usgaonkar |
| 7,937,617 B1 | 5/2011 | Nagineni et al. |
| 2004/0107300 A1 | 6/2004 | Padmanabhan et al. |
| 2004/0205288 A1 | 10/2004 | Ghaffari et al. |
| 2004/0220933 A1 | 11/2004 | Walker |
| 2005/0102562 A1 | 5/2005 | Shinohara |
| 2006/0294337 A1 | 12/2006 | Hartung et al. |
| 2007/0136393 A1 | 6/2007 | Fung et al. |
| 2007/0168711 A1 | 7/2007 | Chen |
| 2008/0086618 A1 * | 4/2008 | Qi .................................. 711/170 |
| 2008/0126615 A1 * | 5/2008 | Sinclair et al. .................. 710/38 |

OTHER PUBLICATIONS

"Failover/Failback policies on Microsoft Cluster Server," Microsoft, Article ID 197047, 2 pages, Nov. 20, 2003.

"Managing HP Serviceguard for Linux," Hewlett Packard, Manufacturing Part Number: B99003-90043, 342 pages, Feb. 2005.

"HP's ServiceGuard Clustering Facility," *The Availability Digest*, 4 pages, May 2007.

* cited by examiner

METHOD AND APPARATUS FOR PROVIDING DYNAMIC MULTI-PATHING (DMP) FOR AN ASYMMETRIC LOGICAL UNIT ACCESS (ALUA) BASED STORAGE SYSTEM

BACKGROUND OF THE INVENTION

1. Field of the Invention

Embodiments of the present invention generally relate to an asymmetric logical unit access based storage system and, more particularly, a method and apparatus for providing dynamic multi-pathing (DMP) for an asymmetric logical unit access (ALUA) based storage system.

2. Description of the Related Art

ALUA based storage systems use multiple processors, or controllers, for controlling access to a plurality of disks that are arranged in at least one array in a storage system. The processors receive I/O traffic (also referred to as I/O's or read/write commands) from a host through a storage area network (SAN). The host communicates with the processors via the processors' ports. Usually, a processor is configured as an "owner processor", which is the owner of a specific disk array. Another processor is configured as "standby processor", which is a backup processor that is available to perform owner functions if the owner processor were to fail. The owner processor executes data access requests within I/O traffic from specific host(s). The owner processor processes the host's I/O traffic commands to/from the disk array it owns. The owner processor may "own" a portion of the disk array, while another processor may "own" another portion of the same disk array. Thus, the owner processor can be a standby processor for a portion of the array it does not own.

Upon a failure condition within the SAN, where the communication paths to the owner processor ports are blocked or otherwise have failed. The host uses dynamic multi-pathing (DMP) to re-route the I/O traffic intended for the owner processor to the standby processor. The re-routed I/O traffic is directed to the standby processor utilizing the communication ports of the standby processor.

In a non-ALUA-based storage system, upon failure of a path to an owner processor (i.e., an optimized path), the DMP process detects the failure and prepares to utilize the standby processor (i.e., an unoptimized path). Upon path failure, some I/O requests may be pending in a queue of the owner processor or otherwise in transit to the owner processor via the optimized path. When new I/O requests are issued to the standby processor via the unoptimized path, the storage system will recognize the failover and flush the owner processor cache to the standby processor; thus, ensuring that cache information is available for use by the standby processor in the same manner as the owner processor. If, after the cache flush, the owner processor executes an I/O request from the owner queue, the storage processor will flush the standby processor cache back to the owner processor. Then, when a new I/O arrives at the standby processor, the owner cache is flushed to the standby processor. This "ping-ponging" of cache flushing continues until the owner queue is empty. Such "ping-ponging" dramatically impacts the speed of the storage system. To avoid ping-ponging in a non-ALUA storage system, the DMP process waits for all queued and in transit I/O requests to be completed by the owner processor before failing over to the standby processor, i.e., the DMP process waits for the I/O requests to be returned—either a write acknowledgement or read data. The need to wait for completion of the I/O requests delays failover and impacts the availability of the storage system.

In an ALUA-based storage system, where ping-ponging does not occur because cache flushing is delayed by the failover process, upon optimized path failure, the multipathing driver also waits for I/O requests previously issued to the owner processor to clear before issuing I/O requests to the standby processor via the unoptimized. The storage system will swap the standby and owner processors after the system detects no activity from the owner processor and the I/O requests are being sent to the standby processor for a predefined period of time, e.g., two minutes. Other failover criteria might include the number of I/O bytes or volume of I/O bytes sent to the standby processor. Alternatively, after waiting for the pre-failure I/O requests to clear, failover may be initiated by the host manually issuing a command to cause the storage system to switch processors. The completion of the failover process is delayed by the amount of time taken for the pre-failure I/O requests to clear plus the time required for the storage array to swap processors.

In both non-ALUA based systems and ALUA-based systems, there is a significant delay between initiation of a failover and the completion of the failover. This delay may cause application process delays, bottlenecks in storage access, I/O traffic delays for all hosts that access the storage system, and system or process failure.

Therefore, there is a need for providing improved dynamic multi-pathing to alleviate the failover delay.

SUMMARY OF THE INVENTION

Embodiments of the present invention comprise a method and apparatus for providing dynamic multi-pathing for an asymmetrical logical unit access (ALUA) based storage system. The method comprises identifying a first processor within a storage system as providing an optimized path to a disk array, identifying a second processor within a storage system as providing an unoptimized path to the disk array, upon detecting a path failure of the optimized path, immediately switching from using the optimized path to using the unoptimized path. In this manner, an application executing on a host that utilizes the storage system does not experience a delay in accessing the storage system during an optimized path failure. In another embodiment of the invention, the optimized and unoptimized paths couple a cluster of host servers to the storage system. Upon optimized path failure to one or more of the hosts, the cluster immediately switches from using the optimized path to the unoptimized path without impacting the operation of any applications executing on the hosts in the cluster.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
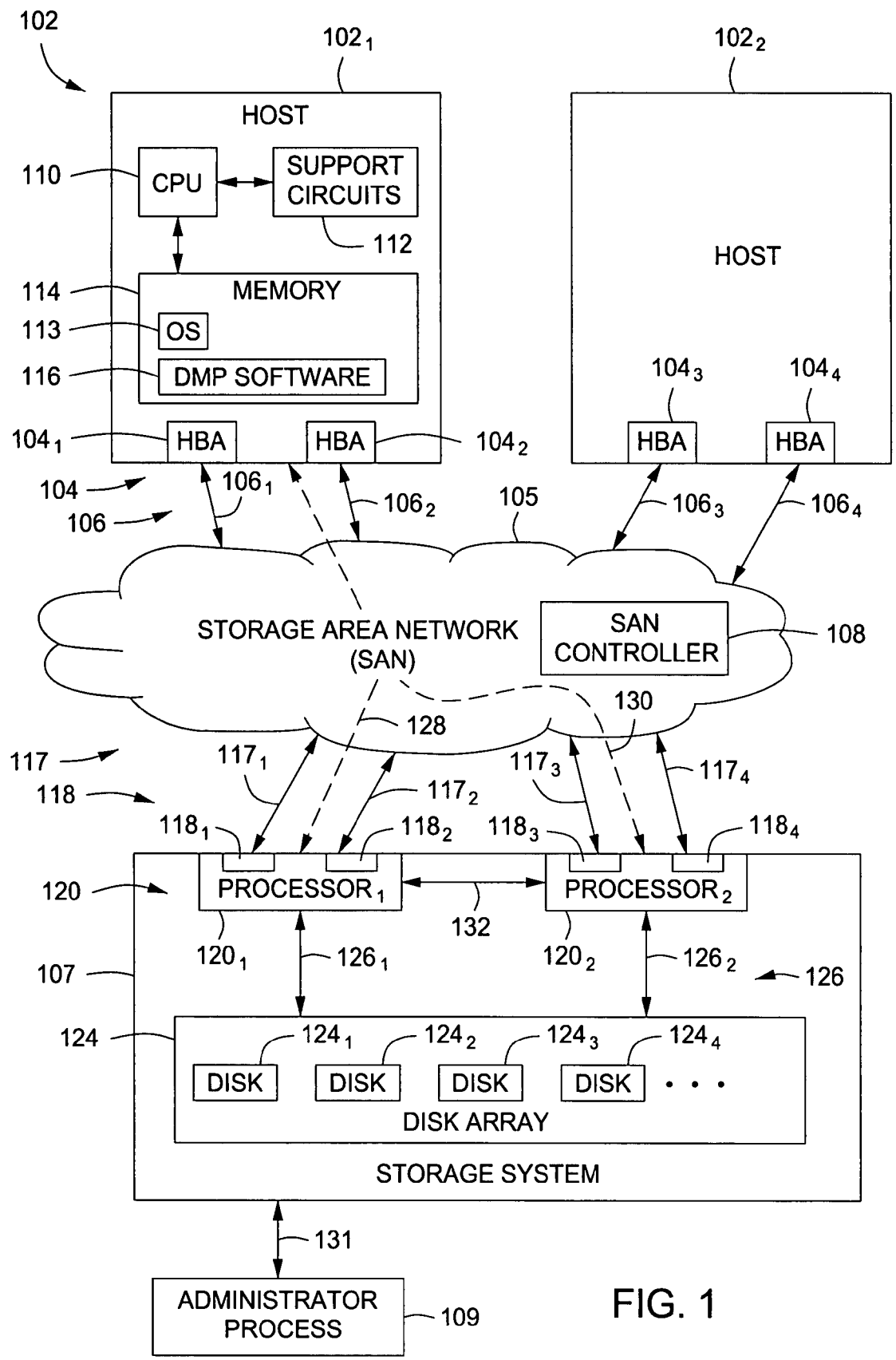
FIG. 1 is a block diagram of the hardware forming an exemplary embodiment of a computer system that operates in accordance with the present invention.

FIG. 1 is a schematic diagram of the hardware forming an exemplary embodiment of a computer system 100 that operates in accordance with the present invention. This figure only portrays one variation of a myriad of possible network configurations. The present invention can function in a variety of computing environments; such as, a distributed computer system, a centralized computer system, a stand alone computer system, or the like. One skilled in the art will appreciate that computing system 100 may or may not contain all the components listed below.

The computer system 100 comprises at least one host 102 (for example hosts $102_1$ and $102_2$), a storage area network (SAN) 105, a storage system 107, and an administrator process 109. Each host $102_1$ and $102_2$ comprise a Host Bus Adapter (HBA) 104, a CPU 110, a support circuit 112 and a memory 114 (details are shown in host $102_1$ only; host $102_2$ comprises substantially similar hardware and software). The CPU 110 may comprise one or more conventionally available microprocessors and/or microcontrollers. The CPU 110 may be an application specific integrated circuit (ASIC). The support circuits 112 are well known circuits used to promote functionality of the CPU 110. Such circuits include, but are not limited to, a cache, power supplies, clock circuits, input/output (I/O) circuits and the like. The memory 114 may comprise random access memory, read only memory, removable disk memory, flash memory, and various combinations of these types of memory. The memory 114 is sometimes referred to main memory and may, in part, be used as cache memory or buffer memory. The memory 114 stores an operating system (OS) 113 and Dynamic Multi-Pathing (DMP) software 108. The operating system 113 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The hosts 102 may include any number of HBA 104. In one embodiment, the host $102_1$ includes HBA $104_1$ and $104_2$, and host $102_2$ includes HBA $104_3$ and $104_4$. The HBA $104_1$, $104_2$, $104_3$ and $104_4$ are coupled to the SAN 105 though communication path $106_1$, $106_2$, $106_3$ and $106_4$, respectively. Thus, the host 102 communicates with the SAN 105 through the communication path $106_1$, $106_2$, $106_3$ and $106_4$. It should be noted that the HBA 104 may be any mechanism that facilitate communications between the host 102 and the SAN 105.

The SAN 105 comprises a SAN controller 108, which is generally configured to control and monitor packet routing through routing hardware within the SAN. The SAN 105 communicates with the storage system 107 via the communication paths 116. The system 100 may include any number of communication paths 116. The SAN 105 may include other components, such as routing hardware including bridges, hubs, routers, switches interconnecting cables (e.g., fiber optic cables), and the like.

The storage system 107 comprises at least one processor 120 and disk array 124. In this embodiment, the storage system 107 comprises processors $120_1$ and $120_2$. The processor $120_1$ includes ports $118_1$ and $118_2$. The processor $120_2$ includes ports $118_3$ and $118_4$. The ports $118_1$, $118_2$, $118_3$ and $118_4$ are coupled to the SAN via the communication path $117_1$, $117_2$, $117_3$ and $117_4$, respectively. The processor 120 may utilize any number of communication paths 117 to connect to the SAN 105. Furthermore, in some storage system implementations, the processors $120_1$ and $120_2$ are coupled to one another via an inter-processor communications (IPC) channel 132. The IPC channel generally carries command and control information amongst the processors within the storage system. The storage system 107 may include various storage resources, including but not limited to Redundant Array of Independent Disks (RAID) systems, disk arrays, JBOD's (Just a Bunch Of Disks, which refers to disks that are not configured according to RAID), tape devices, optical storage devices and the like.

The processors $106_1$ and $106_2$ communicate with the storage system 122 via communication paths $126_1$ and $126_2$. The processor 106 and the storage system 122 may communicate via any number of communication paths 126. The storage system 107 includes a disk array 124, which may be any number of data storage devices. In this embodiment, the disk array includes storage devices $124_1$, $124_2$, $124_3$ and $124_4$. An administrator configures the storage system 107 through the administrator process 109. The administrator process 109 communicates with the storage system 107 via communication path 131. The system 100 may include any number of administrator processes 109 and communication paths 131. The administrator process 109 may be executed by the host $102_1$, host $102_2$, the storage system 107, or some other remote or local computer.

The administrator may also utilize the administrator process 109 to assign each host 102 a disk array 124. For example, the administrator may grant the host $102_1$ access to devices $124_1$ and $124_2$ via the processor $120_1$. Similarly, the administrator may grant the host $102_2$ access to the disks $124_3$ and $124_4$. As such, host $102_1$ becomes "owner" of the comprising storage array devices $124_1$ and $124_2$, while processor $120_2$ may be used as the standby processor for these devices. Similarly, host $102_2$ may be the owner of the array comprising storage devices $124_3$ and $124_4$, while processor $120_1$ may be used as the standby processor for these devices.

In this embodiment, the host $102_{1,2}$ issues I/O traffic to a designated processor $120_{1,2}$. The I/O traffic is routed to the SAN 105 via communication path 106. The SAN controller 108 routes the I/O traffic from the host $102_{1,2}$ to a dedicated processor $120_{1,2}$ via a communication path 116. The administrator utilizes the administrator process 109 to configure the host access to the disk array as discussed above. Consequently, the SAN controller and administrator process together define an optimized path from a host to its storage array. For example, an optimized path is the path from a host $102_1$, through the owner processor $120_1$, to the array 124. The owner processor $120_1$, is generally optimized to provide storage services for its related host $120_1$. In contrast, an unoptimized path is the path from a host $102_1$, through the standby processor $120_2$, to the array 124. This path referred to as unoptimized, or less efficient, because the traffic passes through a processor that is not optimized for the particular host.

In one embodiment of the invention, the processor $120_1$ is assigned a communication path 128 as its optimized path, which couples the host $102_1$ to the processor $120_1$ via port $118_1$ and/or $118_2$, and a communication path 130 as its unoptimized path, which couples the host $102_1$ to the processor $120_1$ via port $118_3$ and/or $118_4$ of the processor $120_2$. The optimized communication path 128 of the processor $120_1$ is utilized to route I/O traffic received by the SAN 105 to the processor $120_1$; whereas, the unoptimized communication path 130 is utilized to route I/O traffic during a failure of the optimized path, for example, when the optimized path 128 is unavailable or failed.

For example, when a DMP process (executed DMP software 116) detects a failure of the optimized path 128, the DMP process instructs the processor $120_2$ (unoptomized processor) of such failure. In accordance with the present invention, the DMP process immediately begins sending I/O requests to the unoptimized processor. Depending upon the nature of the storage system 107, the failover may be initiated through either the DMP process issuing a processor utilization command, such as a Set Target Port Group (STPG) command to control the processor used to handle the I/O requests, or allowing the storage system 107 to initiate an internal failover based upon the utilization of the unoptimized processor. In either instance, from an application running upon the host, the use of the storage system is not interrupted and no delay is experienced—the host immediately sends an application's I/O requests through the unoptimized path 130 upon optimized path failure.

As such, all new I/O requests are set from the host to the array via the unoptomized path 130. Furthermore, any failed I/O requests are reissued to the storage system via the unoptimized path 130. Upon receiving the processor utilization command (e.g., STPG command) or failing over using another technique, the previously unoptomized processor $120_2$ becomes an optimized processor $120_2$ for the host $102_1$. The effect of issuing the STPG command from the DMP process is that the failover is immediately implemented. However, whether failover is immediate or not, the host 102 immediately sends I/O requests through the unoptimized path. There is no delay experienced by a host application waiting for the storage system to perform a failover to the standby processor.

In another embodiment, the DMP process SAN controller 105 may be configured to re-route I/O traffic to an unoptimized path if the optimized path reaches a performance threshold. For example, if the host detects a bandwidth limitation was reached for the optimized communication path 128 of the processor $120_1$, the DMP process may re-route I/O traffic from the optimized communication path 128 of the processor $120_1$ to the unoptimized communication path 130 using the processor $120_2$. In this manner the unoptimized path may be used to augment the I/O traffic throughput of the optimized path.

In another embodiment of the invention, at least one second host $102_2$ is utilized within the computer system 100. Such multi-host systems are known as clusters and are organized to perform distributed computing and provide high availability within a computing environment. A cluster may be defined and controlled by software such as Cluster Volume Manager available from Symantec Corporation. In the depicted embodiment, a cluster 102 is formed of hosts $102_1$ and $102_2$. Both hosts $102_1$ and $102_2$ are arranged to use the processor $120_1$ as the owner and processor $120_2$ as the standby processor. Thus, the hosts of a cluster use a common processor for accessing a given set of disks (e.g., disks $124_1$ and $124_2$). Each host $102_1$ and $102_2$ has a defined optimized and unoptimized path to a particular portion of the array. Upon a communication path failure of an optimized path for a specific host, the DMP process as described above, switches to the unoptimized path for the host having an optimized path failure. The cluster 102 (i.e., all hosts in the cluster) uses a common processor for access to the array. As such, upon failure of the optimized path for a host $102_2$ in a cluster 102, all other hosts $102_1$ in a cluster 102 will failover to the standby processor such that the standby processor $120_2$ becomes the owner processor for all the hosts in a cluster. As such, the invention supports high availability of the storage array to the cluster with immediate and continuous access to the storage array for the entire cluster.

In another embodiment of the invention, host $120_1$ has access to the storage system 107 through only the owner processor, while host $102_2$ has access through both the owner and standby processors. Both hosts will use the optimized path through the owner processor for I/O requests. Upon failure of the optimized path for host $120_2$, only the host $120_2$ can switch to the unoptimized path through the standby processor, while host $120_1$ continues to use the optimize path. In this manner, an application utilizing the storage system from either host would not be impacted by the optimized path failure.

Figure 2:
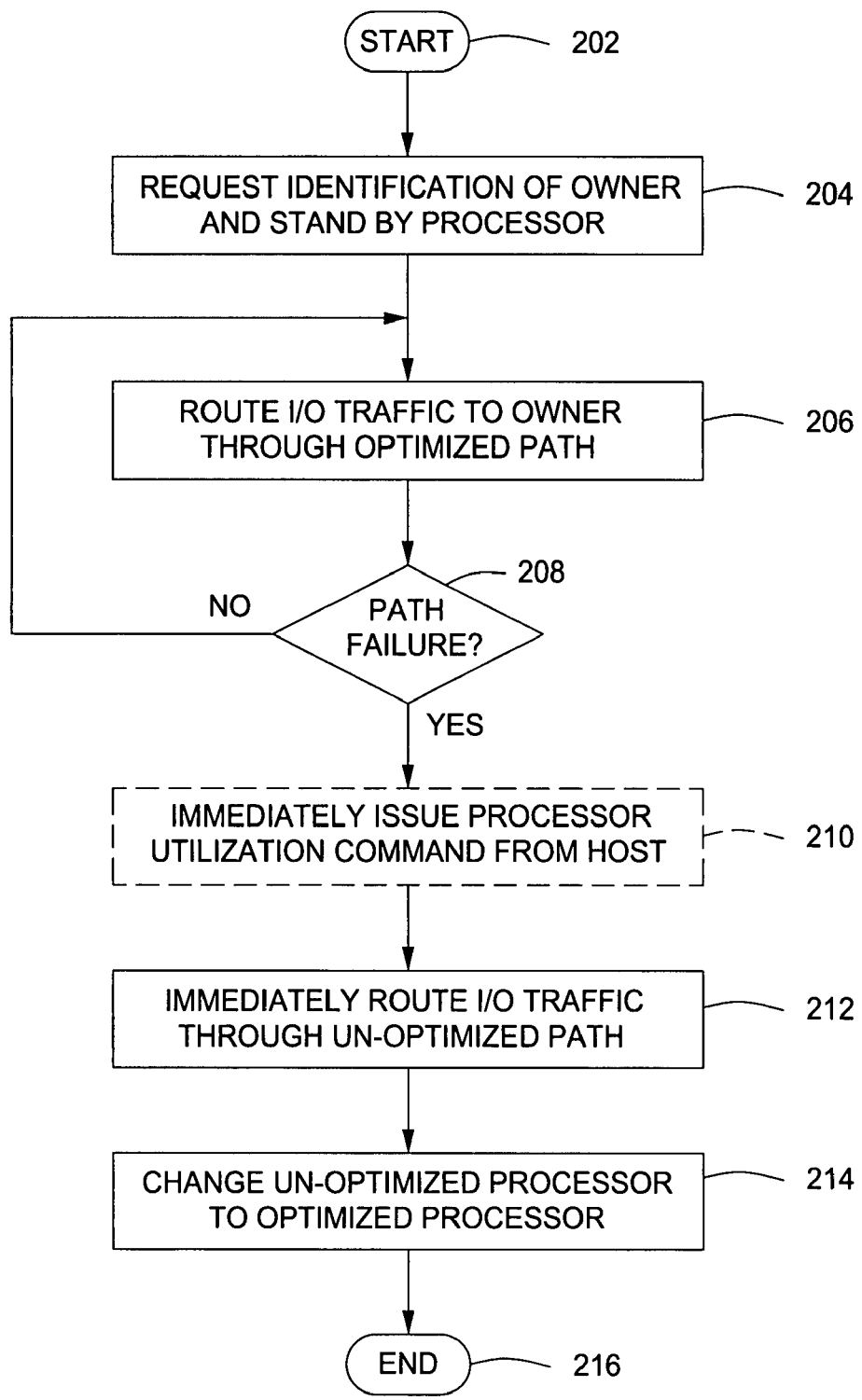
FIG. 2 is a flow diagram depicting an exemplary embodiment of a method for providing Dynamic Multi-Pathing (DMP) for an asymmetric logical unit access (ALUA) based storage system in accordance with one embodiment of the invention.

FIG. 2 is a flow diagram depicting an exemplary embodiment of a method 200 providing Dynamic Multi-Pathing (DMP) for an asymmetric logical unit access based storage system. The method 200 starts at step 202 and proceeds to step 204, wherein the method 200 requests identification of owner and standby processors. At step 206, the host directs I/O traffic to the owner processor through the optimized path. At step 208, if the optimized path has not failed, the method 200 proceeds to step 206 and continues using the optimized path. If the optimized path fails, the method 200 proceeds from step 208 to step 210, wherein the host may issue, depending upon the nature of the storage system, a processor utilization command, e.g., a set target port group (STPG) command to switch to an unoptomized path and utilize a standby processor. The dashed box of step 210 indicates the optional nature of the step. Other techniques fro initiating a failover of the processors in a storage array may also be utilized. For example, for some storage arrays, the mere use of the standby processor initiates a failover without the need for the host to issue a command. At step 212, no matter what the method of failover initiation, the I/O traffic is immediately directed through the unoptimized path. At step 214, a failover process executed by the ALUA-based storage system causes the unoptomized processor to become an optimized processor. The method 200 ends at step 216.

While the foregoing is directed to embodiments of the present invention, other and further embodiments of the invention may be devised without departing from the basic scope thereof, and the scope thereof is determined by the claims that follow.

What is claimed is:

1. A method for providing dynamic multi-pathing for an asymmetrical logical unit access (ALUA) based storage system comprising:
   identifying a first processor within a storage system as providing an optimized path to a disk array;
   identifying a second processor within a storage system as providing an unoptimized path to the disk array, and
   in response to a failure of the optimized path, immediately switching from the first processor to the second processor by issuing one or more processor utilization commands to alter a role of the first processor from an owner to a standby processor such that the first processor provides an unoptimized path to the disk array and to alter the role of the second processor from the standby processor to the owner such that the second processor provides an optimized path to the disk array.

2. The method of claim 1, wherein the optimized path comprises coupling input/output (I/O) traffic through the first processor to the disk array.

3. The method of claim 1 further comprising detecting a failure within the optimized path to cause switching to the unoptimized path.

4. The method of claim 1, wherein the switching from the optimized path to the unoptimized path is a result of reaching a performance threshold of the optimized path.

5. The method of claim 1, wherein the one or more processor utilization commands are a Set Target Port Group (STPG) command.

6. The method of claim 1 wherein the host performs a dynamic multi-pathing process for routing I/O traffic through at least one of the optimized path and the unoptimized path.

7. The method of claim 1 wherein the immediately switching step switches from the optimized path to the unoptimized path without waiting for pre-failure I/O requests to complete.

8. Apparatus for providing dynamic multi-pathing for an asymmetric logical unit access (ALUA) based storage system comprising:
   a host for selectively routing I/O traffic;
   an ALUA-based storage system, coupled to the host, comprising at least a first processor and a second processor, where the first processor defines at least a portion of an optimized path to a disk array and the second processor defines a portion of an unoptimized path to the disk array;
   wherein, upon failure of the first processor, the host immediately routes I/O traffic through the second processor by issuing one or more processor utilization commands to alter a role of the first processor from an owner to a standby processor such that the first processor provides an unoptimized path to the disk array and to alter a role of the second processor from the standby processor to the owner such that the second processor provides an optimized path to the disk array.

9. The apparatus of claim 8, wherein the host simultaneously routes I/O traffic through both the optimized and unoptimized paths.

10. The apparatus of claim 8, wherein the processor utilization command is a Set Target Port Group (STPG) command.

11. The apparatus of claim 8 wherein the host performs a dynamic multi-pathing process for routing I/O traffic through at least one of the optimized path and the unoptimized path.

12. The apparatus of claim 8 wherein the host routes I/O traffic through the unoptimized path without waiting for pre-failure I/O requests to complete.

13. The apparatus of claim 8 further comprising a plurality of hosts forming a cluster, wherein, upon failure of the optimized path for any one host in the cluster, the plurality of hosts in a cluster switch to using an unoptimized path.

14. The apparatus of claim 13 wherein, upon the failure of an optimized path, all the hosts in the cluster have access to the disk array of the storage system.

15. A system for providing dynamic multi-pathing for an ALUA-based storage system comprising:
   at least one host executing a dynamic multi-pathing (DMP) process;
   at least one storage array network (SAN) coupled to the at least one host; and
   at least one ALUA-based storage system, coupled to the at least one SAN, wherein the at least one storage system and the at least one host communicate through at least one optimized communication path and at least one unoptimized communication path, and wherein, upon failure of the optimized path, the DMP process immediately switches between the optimized and the unoptimized communication paths by issuing one or more processor utilization commands to alter a role of a first processor from an owner to a standby processor such that the first processor provides an unoptimized path to the disk array and to alter a role of a second processor from the standby processor to the owner such that the second processor provides an optimized path to the disk array.

16. The apparatus of claim 15 further comprising a plurality of hosts forming a cluster, wherein, upon failure of the optimized path, for any one host in the cluster, the plurality of hosts in a cluster switch to using an unoptimized path.

17. The apparatus of claim 16 wherein, upon the failure of an optimized path, all the hosts in the cluster have access to the disk array of the storage system.

18. The method of claim 15 wherein at least one host in the cluster only has an optimized path and, upon failure of the optimized path for a host having both an optimized and an unoptimized path, the host having both optimized and unoptimized paths switches to an unoptimized path, while the at least one host having only an optimized path remains coupled to the storage system via the optimized path.

* * * * *